United States Patent [19]
Reddi et al.

[11] Patent Number: 5,831,164
[45] Date of Patent: Nov. 3, 1998

[54] LINEAR AND ROTATIONAL ACCELEROMETER

[75] Inventors: M. Mahadeva Reddi, Bryn Mawr; Donald F. DeCleene, Wyndmoor, both of Pa.

[73] Assignee: Conrad Technologies, Inc., Paoli, Pa.

[21] Appl. No.: 786,774

[22] Filed: Jan. 21, 1997

[51] Int. Cl.$^6$ ................................ G01P 15/00
[52] U.S. Cl. .................... 73/514.01; 73/514.02; 73/514.18; 73/514.32; 73/514.21; 73/514.22; 73/514.36; 73/514.38; 73/510
[58] Field of Search ............ 73/514.01, 514.02, 73/510, 514.16, 514.17, 514.18, 514.21, 514.22, 514.23, 514.24, 514.32, 514.35, 514.36, 514.37, 514.38, 1.38; 340/669

[56] References Cited

U.S. PATENT DOCUMENTS

| | | | |
|---|---|---|---|
| 2,830,147 | 4/1958 | Thomson | 200/61.46 |
| 3,389,607 | 6/1968 | Kishel | 73/514.01 |
| 3,534,615 | 10/1970 | Horvath | 73/510 |
| 3,625,068 | 12/1971 | Kelly | 73/514 |
| 3,693,425 | 9/1972 | Starita et al. | 73/133 |
| 3,782,785 | 1/1974 | Budzich | 303/21 F |
| 3,926,059 | 12/1975 | Fish | 73/510 |
| 4,038,876 | 8/1977 | Morris | 73/432 R |
| 4,094,192 | 6/1978 | Watson et al. | 73/133 R |
| 4,219,940 | 9/1980 | Okubo | 33/366 |
| 4,445,376 | 5/1984 | Merhav | 73/510 |
| 4,920,801 | 5/1990 | Church | 73/514.16 |
| 4,984,463 | 1/1991 | Idogaki et al. | 73/516 R |
| 5,249,465 | 10/1993 | Bennett et al. | 73/514.02 |
| 5,415,040 | 5/1995 | Nottmeyer | 73/517 R |
| 5,473,945 | 12/1995 | Grieff et al. | 73/510 |

OTHER PUBLICATIONS

S. Suzuki et al., "Semiconductor Capacitance–type Accelerometer with PWM Electrostatic Servo Technique", Sensors and Actuators, A21–A23, (1990), pp. 316–319.

H. Leuthold et al., "An ASIC for High–resolution Capacitive Microaccelerometers", Sensors and Actuators, A21–A23, (1990), pp. 278–281.

H. Allen et al., "Accelerometer Systems with Built–in Testing", Sensors and Actuators, A21–A23, (1990), pp. 381–386.

Cheryl Ajluni, "Accelerometers: Not Just For Airbags Anymore," Electronic Design, (Jun. 12, 1995) (pp. 93–106).

B. Bill et al., "Measuring Simultaneously Translational and Angular Acceleration with the New Translational–Angular–Piezobeam (TAP) System," Sensors and Actuators, A21–A23 (1990) (pp. 282–284).

Burton Boxenhorn et al., "Monolithic Silicon Accelerometer," Sensors and Actuators, A21–A23 (1990) (pp. 273–277).

(List continued on next page.)

*Primary Examiner*—Hezron E. Williams
*Assistant Examiner*—Richard A. Moller
*Attorney, Agent, or Firm*—Ratner & Prestia

[57] ABSTRACT

A two degree of freedom (2 DOF) accelerometer comprising two imbalanced sensing modules (i.e., bar modules having an unbalance) is provided such that two sensing modules are located in the plane to be measured. The two imbalanced sensing modules have force balance and are used to measure linear and angular accelerations in two degrees of freedom. A single modular design is used for both of the axes. Each of the two individual sensing modules has a housing containing a proof mass for each measured output and a support of the proof mass with the support optimized for the sensitive axis selected for sensor output and having high rigidity in all other axes of the support. Also provided is electrostatic servo force balance technology. A proportional-integral-derivative (PID) controller is used to obtain a closed loop bandwidth of 1 kHz and a steady state error of zero for full scale accelerations up to 75 g's and 1000 rad/sec$^2$.

19 Claims, 7 Drawing Sheets

OTHER PUBLICATIONS

Theresa A. Core et al., "Fabrication Technology for an Integrated Surface–Micromachined Sensor," Advanced Device Packaging, Solid State Technology (Oct. 1993), (pp. 39–47).

Theresa Core et al., "Integrated, Complete, Affordable Accelerometer for Airbag Applications," Sensors Expo Proceedings (1991) (pp. 204B–1–204B–4).

J. D'Azzo et al., "State Variable Feedback (Physical Variables)," Control Systems Analysis and Design: Conventional and Modern Approaches, Linear Control System Analysis and Design (pp. 436–439).

J. S. Danel et al., "Mircromachining of Quartz and its Application to an Acceleration Sensor," Sensors and Actuators, A21–A23 (1990) (pp. 971–977).

Paul Frisch et al., "Design of an Improved Capability Electronic Ejection Sequencer (ICEES), Feasibility Study: Use of Clustered Accelerometry Techniques for Real time Ejection Seat Position Tracking," (pp. 193–199).

Frank Goodenough, "Airbags Boom When IC Accelerometer Sees 50G," Electronic Design (Aug. 8, 1991) (8 pp.).

Dominicus J. IJntema et al., "Static and Dynamic Aspects of an Air–gap Capacitor," Sensors and Actuators, A 35 (1992) (pp. 121–128).

John M. Kubler, "Introduction to Variable Capacitance Silicon Microsensors," Sensors (Aug. 1995) (pp. 57–59).

Wolfgang Kuehnel et al., "A Surface Micromachined Silicon Accelerometer with On–Chip Detection Circuitry," Sensors and Actuators, A 45 (1994) (pp. 7–16).

Anthony Lawrence, "Gyro and Accelerometer Errors and Their Consequences," Modern Inertial Technology (1993) (pp. 24–41).

Shumin Li et al., "The Development of a Six–Axis Arrayed Transducer," (7pp).

G. A. MacDonald, "A Review of Low Cost Accelerometers for Vehicle Dynamics," Sensors and Actuators, A21–A23 (1990) (pp. 303–307).

Wang Ping et al., "Research on the Dynamic Test Method for Force–Balance Accelerometers (FBAs) with Electric Stimulation , Part 1. Errors Analysis of Current–Source Type FBAs," Sensors and Actuators, A 45 (1994) (pp. 23–27).

Wang Ping et al., "On Modelling the Dynamic Non–linearity of Force Balance Accelerometers (FBAs)," Sensors and Actuators, A 45 (1994) (pp. 29–33).

Bob Puers et al., "A New Uniaxial Accelerometer in Silicon Based on the Piezojunction Effect," IEEE Transactions on Electron Devices, vol. 35, No. 6 (Jun. 1988) (pp. 764–770).

F. Rudolf et al., "Precision Accelerometers with g Resolution," Sensors and Actuators, A21–A23 (1990) (pp. 297–300).

D. W. Satchell et al., "A Thermally–Excited Silicon Accelerometer," Sensors and Actuators, 17 (1989) (pp. 241–245).

Alfred R. Schuler et al., "Measuring Rotational Motion with Linear Accelerometers," IEEE Transactions on Aerospace and Electronic Systems, vol. AES–3, No. 3 (May 1967) (pp. 465–471).

H. Seidel et al., "Capactive Silicon Accelerometer with Highly Symmetrical Design," Sensors and Actuators, A21–A23 (1990) (pp. 312–315).

Anthony J. Severyn et al., "Calibration System for Rotational Transducers," 11th International Seminar on Modal Analysis, University of Leuven, Belgium (Sep. 1986) (pp. 1–13).

T. R. Shee et al., "Experimental Validation of the 2D In–Line Accelerometer Analysis Package," The Winter Annual Meeting of The American Society of Mechanical Engineers, San Francisco, CA, AMD–vol. 106, BED–vol. 13 (Dec. 10–15, 1989) (125–126).

W. Simon, "Digital Low–Pass Filter Without Phase Shift," NASA Tech Briefs (Jul. 1993) (pp. 83–84).

K. Yamada et al., "A Novel Silicon Accelerometer with a Surrounding Mass Structure," Sensors and Actuators, A21–A23 (1990) (pp. 308–311).

Weiji Yun et al., "Silicon Microfabricated Accelerometers: A Perspective on Recent Developments," Sensors Expo Proceedings (1991) (pp. 204A–1–204A–8).

Henry V. Allen et al., "Accelerometer Systems with Self–testable Features," Sensors and Actuators, 20 (1989) (pp. 153–161).

R.C. Mehta, "Low–Frequency Sensitive Force–Balance Linear Standard Accelerometer," IEE Proceedings, vol. 134, Pt. A, No. 1, (Jan. 1987) (pp. 45–47).

B. Sukhov et al., "Solid–State Silicon Servo Accelerometer," Conference Digest — International Electrical, Electronics Conference and Exposition (1983) (pp. 312–313).

R.G. White et al., "A Study of Servo Accelerometer Design For Low Frequency Vibration Measurement," ISVR Tech Report No. 85, University of Southampton, (Sep. 1975) (pp. 1–33).

FIG. 2B $$\Sigma M = 0 = MA\varepsilon - I\alpha + T$$
$$T = -MA\varepsilon + I\alpha$$

FIG. 8

LINEAR AND ROTATIONAL ACCELEROMETER

GOVERNMENT SUPPORT

This invention was at least partially supported by the Naval Air Warfare Center contract nos. N62269-95-C-0023 and N62269-96-C-0065. The government may have certain rights in this invention.

FIELD OF THE INVENTION

The present invention relates to accelerometers in general. In particular, the present invention describes a linear and rotational accelerometer using sensing modules having an eccentric bar and using an electrostatic servo technique.

BACKGROUND OF THE INVENTION

Accelerometers are used in such diverse areas as industrial, medical, railway, automotive and aerospace engineering.

Researchers attempting to quantify human response to acceleration commonly use surrogates of various kinds, including cadavers and mannequins. As a surrogate for assessing injury, a mannequin desirably yields sufficient information about the severity of the injuries that are likely to occur in a specific situation. This requires instrumentation for measuring the causative mechanical parameters, and knowledge of the human biomechanical responses to these parameters, including the likely modality, and the severity of the resulting injuries. Thus, adequate instrumentation, including accelerometry, is desirable for developing injury criteria based on cadaver testing and for applying the criteria to test and evaluate escape systems under development by using mannequins.

The technology base of a multiple degree of freedom accelerometer, such as a two degree of freedom (2 DOF) accelerometer, is useful in structural system identification and modification. In the field of modal analysis, advanced parameter estimation techniques place stringent requirements for rotational information in the experimental modal data base, particularly for beam and plate structural modifications. Consequently, measurement of rotational degrees of freedom has become increasingly more important.

The Department of Defense and the National Highway Traffic Safety Administration (NHTSA) would benefit from use of a multiple DOF accelerometer. The Army can evaluate crashworthiness of helicopter seats, the Navy and the Air Force can evaluate aircraft escape systems, and the NHTSA can formulate Federal Motor Vehicle Safety Standards (FMVSS) for automobiles. Also, variants of a 2 DOF accelerometer can be used in applications for terrestrial and space use, and in guidance of projectiles and missiles.

In industry, automobile manufacturers can use a multiple DOF accelerometer with dummies to test safety systems for compliance with various FMVSS. Both automotive and civil aviation requirements can benefit from the multiple DOF accelerometer through lower acquisition costs.

In long standing and pedestrian areas such as machinery monitoring, a single 2 DOF accelerometer can provide signatures of malfunctions that are superior to those which can be obtained at a much greater cost by a multitude of transducers. The main reason for the continued use of multiple transducers is that multiple DOF accelerometers have not been commercially available. Thus, low cost, off-the-shelf availability of a multiple DOF accelerometer will improve present day applications and also foster the development of new uses.

In military escape systems employing ejection seats, three dimensional thrust vector control systems are used to provide ejection seat attitude control and trajectory steering. The control system for these applications requires the input of angular information for attitude control and linear information for trajectory control. Six degrees of freedom (6 DOF) accelerometry (three linear degrees of freedom and three angular degrees of freedom) is desirable for these advanced systems so that a single instrument can meet the dual needs of controlling and monitoring the potential for injury.

Therefore, a need exists for instrumentation with the capability to measure accelerations in two or more degrees of freedom to enable quantification of injury mechanisms and assist in the testing and evaluation of escape systems and crashworthy seating systems. The quantified biodynamic data would become the driving force for the design of systems such as advanced seating systems, restraint systems and cockpit layouts.

SUMMARY OF THE INVENTION

The present invention provides an accurate, low cost, miniaturized 2 DOF accelerometer suitable for use in the above applications and for evaluating the injury potential of aircraft crew escape systems, and additionally as an inertial sensor for controlling the attitude and trajectory of an ejection seat during the escape sequence.

An accurate, low cost, miniaturized 2 DOF accelerometer is provided. The 2 DOF accelerometer of the present invention comprises a plurality of sensing modules for determining linear and angular accelerations in a plurality of degrees of freedom. Each sensing module comprises a housing; a proof mass having a dimension, a shape, a mass, and a center of gravity, the proof mass mounted displaced from the center of gravity by a distance which produces a mass imbalance; a support for connecting the proof mass and the housing together; and a detector for detecting a displacement of the proof mass, wherein the proof mass is responsive to both angular and linear acceleration.

According to one aspect of the invention, the dimension of the proof mass may be a length and the distance which produces the mass imbalance is preferably small relative to the length of the proof mass. The detector includes a plurality of capacitors, each capacitor having substantially the same construction and comprising a fixed electrode located opposite to a surface of the flat bar. Processing circuitry may be provided for receiving a signal indicative of any angular or linear acceleration imposed on the proof mass and responsive to a second signal generated by a second sensing module which is substantially the same as the first sensing module to generate a measure of both linear and angular acceleration.

The exemplary accelerometer of the present invention uses an electrostatic servo system for force balancing. A proportional-integral-derivative controller is used to obtain a closed loop bandwidth of 1 kHz and a steady state error of zero for full scale accelerations up to 75 g's and 1000 rad/sec$^2$. Pulse width modulation (PWM) may be used in the electrostatic force balancing system. If a properly stiff support is used, force balancing is not needed.

DESCRIPTION OF EXEMPLARY EMBODIMENTS AND BEST MODE

This invention relates to a low cost two degree of freedom (2 DOF) accelerometer using an electrostatic servo technique. Two proof masses are used for sensing 2 DOF acceleration.

A 2 DOF accelerometer is provided by assembling two imbalanced sensing modules (i.e., bar modules having an unbalance) such that two sensing modules are located in a plane in which linear and angular acceleration are to be measured. An imbalanced sensing module with force balance is used as an exemplary module in the 2 DOF accelerometer to measure linear and angular accelerations in two degrees of freedom. A single modular design is used for each of the two axes. Because the same modular design is utilized for both axes, the fabrication cost is reduced. The exclusive use of imbalanced sensing modules that are substantially the same has the advantage that only one type of sensor module is required.

Each of the two individual sensing modules has a housing containing (1) a proof mass for each measured output and (2) a support of the proof mass with the support optimized for the sensitive axis selected for sensor output and having high rigidity in all other axes of the support. Also provided is electrostatic servo force balance apparatus. Each of these components are described in further detail below. The two modules are arranged to measure acceleration through a common origin in two degrees of freedom.

Figure 1A:
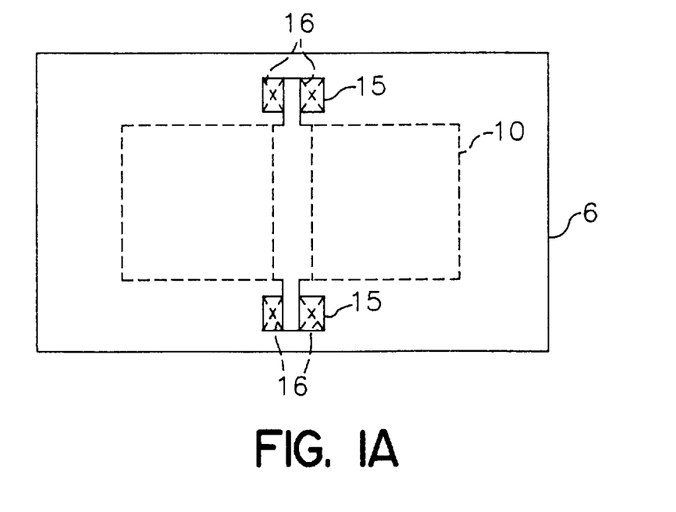
FIG. 1A is a top view of an exemplary imbalanced bar module (sensing module) in accordance with the present invention.
Figure 1B:
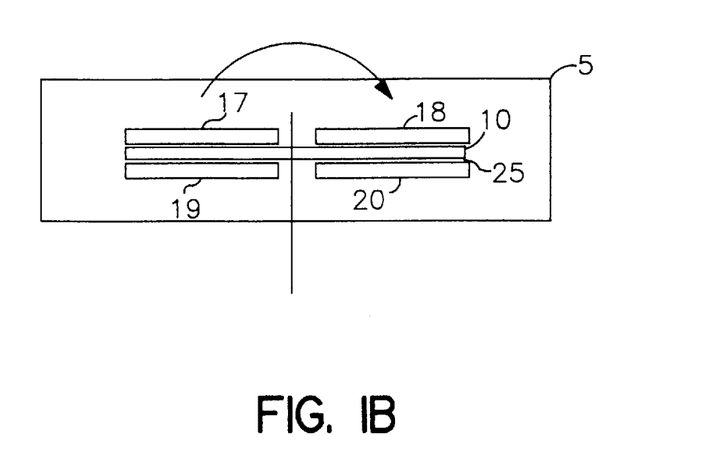
FIG. 1B is a side view of the sensing module of FIG. 1A.

FIGS. 1A and 1B show an exemplary sensing module 5 having an imbalanced (i.e., eccentric) flat bar 10 which acts as the proof mass. The bar 10 is suspended in a housing 6. The imbalanced flat bar 10 includes support 15 on two sides to provide an axis of rotation. The support 15 is torsional if it is fixed, but may include a bearing 16 (shown in phantom) and not be fixed. The support 15 attaches the bar 10 to a housing. The exemplary bar 10 is deliberately mounted off-center by 0.00104 cm to produce a controlled mass imbalance about the center of rotation. The bar 10 is mounted between four fixed electrodes 17, 18, 19 and 20 which serve as capacitor plates to sense the angular excursion of the bar 10 from a null position and, at the same time, apply electrostatic forces as part of a force balance control system to restore the bar 10 to its null position. Between the bar 10 and each of the electrostatic plates 17–20, there is a capacitive gap 25 of, for example, 0.005 cm. Differential capacitance changes resulting from positional tilt of the flat bar 10 due to accelerations are sensed by the electrodes 17–20. Insulation material (not shown) is optionally placed on top and bottom of the bar 10.

Electrostatic force balance technology is used along with a proportional-integral-derivative (PID) controller. The imbalanced flat bar 10 responds to both linear and angular accelerations. The linear and angular accelerations are extracted from signals obtained from pairs of parallel rotation sensing modules positioned in such a way that the center of gravity locations of the flat bars have mirror symmetry.

Table 1 shows the preferred specifications of the exemplary sensing module including dimensioning of surfaces, tolerances, material selection, material properties, assembly procedures and fabrication parameters.

TABLE 1

| | Specifications | |
|---|---|---|
| A | Maximum Linear Acceleration | 735.5 m/sec$^2$ |
| α | Maximum Rotational Acceleration | 1000 rad/sec$^2$ |
| t | Thickness of Rotational Bar (height of the bar) | 3000 μm |
| W | Width of Rotational Bar | 215 μm |
| L | Length of Rotational Bar | 7000 μm |
| r | Radius of Torsion Bar Supports | 45 μm |
| $L_T$ | Length of Torsion Bar Supports | 354 μm |
| $R_D$ | Mean Drive Radius | 1900 μm |
| $A_C$ | Total Cell Area | 0.0000192 m$^2$ |
| ε | Eccentricity of Mass Center | 10.4 μm |
| E | Modular of Elasticity (Aluminum) | 70.0 × 10$^9$ N/m$^2$ |
| G | Shear Modulus (Aluminum) | 27.5 × 10$^9$ N/m$^2$ |
| ρ | Density (Aluminum) | 2.7 × 10$^6$ N/m$^3$ |
| Δx | Cross Axis Deflection | 0.01 μm or less |
| d | Displacement | 1 μm or greater |
| L | Gap Length at Null Position | 50 μm |
| M | Proof Mass | 0.0122 gr |
| I | Rotational Inertia | 4.9825 × 10$^{-8}$ gr-m$^2$ |
| | Values At Constant Maximum Acceleration | |
| T | Inertial Torque | 1.4319 × 10$^{-7}$ N-m |
| Δd | Open Loop Gap Displacement (Outer Edge) | 1 μm |
| θ | Open Loop Angular Displacement | 0.0002853 radian |
| ΔX$_{max}$ | Cross Axis Deflection | 0.0092 μm |
| $F_c/A_c$ | Electrostatic Force Per Unit Area | 3.92 N/m$^2$ |
| P | Percent of Dielectric Potential | 9.9% |

The principle for determining the linear acceleration of an imbalanced sensing module is based on Newton's Second Law, that is, acceleration of a body is directly proportional to the net force producing the acceleration and inversely proportional to the mass. In a similar manner, the determination of the angular acceleration of a proof mass is based on the principle that the mass moment of inertia multiplied by the angular acceleration is equal to the summation of torques.

The design of the proof mass for the sensing module 5 establishes the manner in which acceleration is sensed and therefore, to a large extent, determines the performance characteristics of the sensing module 5 as well as the performance characteristics of any multiple axes assembly constructed with the individual sensing modules.

An imbalanced flat bar 10 of a predetermined size and weight serves as the proof mass and is the acceleration transducer of the sensing module 5. The sensing module 5 responds to one rotational axis and one linear axis and provides a means of measuring the combined results of the two axes.

The bar 10 as shown in FIGS. 1A and 1B has a thickness (or height) of 3000 $\mu$m, a length of 7000 $\mu$m, and a width of 215 $\mu$m. The bar module 5 is supported by two microminiature brackets or hinges 15, but any type of hinge system or shaft system with or without bearings can be used.

In the sensing module 5 in which an imbalanced flat bar 10 is used as the proof mass, the inertial force of the flat bar 10, which occurs as a result of a linear acceleration of the module 5, acts through the center of mass of the flat bar 10. With the center of mass offset from the center Of rotation, the flat bar 10 responds to the inertial force with an initial or attempted rotation about its center of rotation. In a similar manner, a rotational acceleration of the sensing module 5 also results in an initial or attempted rotation of the flat bar 10 about its center of rotation. As such, the flat bar 10 transduces both the linear and rotational acceleration of the sensing module into a combined response of the flat bar 10.

A flat bar 10 is selected as the proof mass because it can be easily and accurately manufactured and its simplicity reduces the fabrication cost. Its simplicity, however, does not mean that the tolerances of the physical parameters of the flat bar 10 may be relaxed. For the sensing module 5, the total mass of the flat bar 10, the location of the center of gravity of the flat bar 10, and the rotational inertia of the flat bar 10 about its center of rotation are features of the flat bar 10 that influence its performance in measuring linear and rotational acceleration.

In addition to the flat bar 10 being properly controlled to provide an adequate response to acceleration, the flat bar 10 also provides proper interfacing with the electrostatic force balance servo which balances the inertial forces and measures the acceleration level by providing a measurement of the force required to balance the inertia of the flat bar 10. In the exemplary embodiment, a capacitive coupling between fixed capacitive surfaces 17–20 and the surface of the flat bar 10 is used to measure the displacement of the proof mass. Also, the same (or auxiliary plates) are used as electrodes 17–20 in the electrostatic force generator in order to apply balancing forces to the flat bar 10. Dedicated surfaces of the flat bar 10 act both as an element of the capacitive displacement sensor and as an element of the electrostatic force generator. Pulse width modulation (PWM) or charge pumps may be used in the electrostatic force balancing system. If a proper stiff support is used, force balancing is not needed.

The bar of the exemplary embodiment is made of phosphor bronze. A lighter material, such as aluminum, or a deposited material, such as a silicon compound, could also be used. The bar may be formed by conventional machining processes or micro-machining processes.

The support of the proof mass is a critical factor in the performance of the accelerometer. Ideally, the flat bar 10 should be adequately supported so that cross axis acceleration does not disturb the position of the flat bar 10 in the electrostatic force field. In one exemplary arrangement, the support 15 allows the flat bar 10 to move only in the direction in which measurement is to be obtained. In other words, the structural support mechanism 15 provides support to the flat bar 10 in all axes except the selected axis of measurement. For the exemplary sensing module 5, this direction of measurement is a rotation about a fixed axis of the flat bar 10. All other displacement of the flat bar 10 is attenuated to reduce cross axes sensitivity. In addition, the support 15 desirably does not introduce any inconsistent forces of its own, such as friction or temperature dependent variations.

The support 15 is desirably rugged enough to support the flat bar 10 under specified conditions of shock loading. Moreover, the support mechanism 15 is preferably friction free.

Only a very minimal amount of displacement in the direction of sensitivity is required for proof mass response in an electrostatic servo force balance accelerometer. The required displacement, preferably one micron or less, can be obtained through deflection in an elastic support.

The exemplary proof mass support 15 consists of a double torsional bar support that can be machined from the same piece of material as the flat bar 10 as an extension of the flat bar 10. Alternative embodiments include various arrangements of elastic hinges, taut bands, and bearing supports. The use of elastic hinges, taut bands, torsional shafts or bearing supports provide similar advantages in that they are essentially frictionless and provide good repeatability.

Figure 2A:
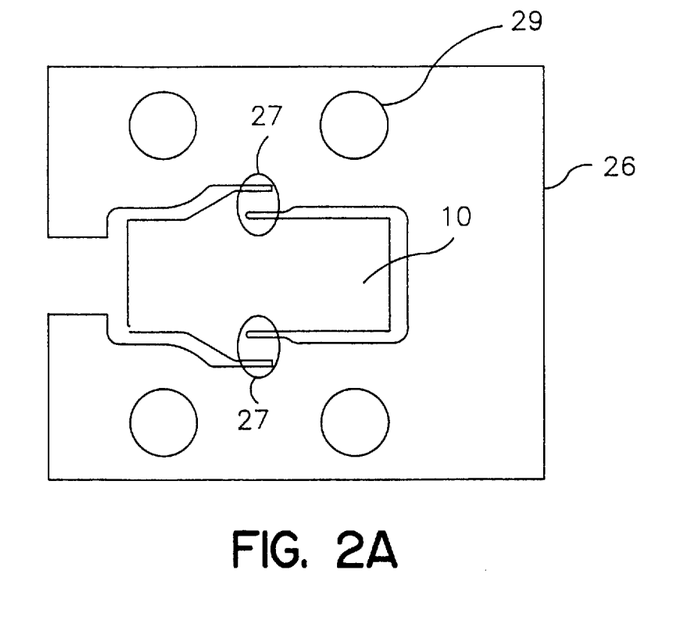
FIG. 2A is a top view of a further exemplary sensing module in accordance with the present invention.
Figure 2B:
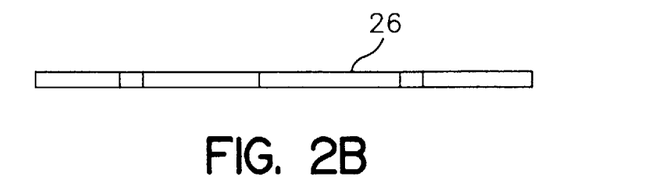
FIG. 2B is a side view of the sensing module of FIG. 2A.

Referring to FIGS. 2A and 2B, there is shown a top view and a side view, respectively, of another exemplary embodiment of a rotation sensing module in accordance with the present invention. This sensing module 26 floats on the hinge 27. The hinge 27 is an elastic hinge or cantilever beam. Holes 29 are used in the assembly process. The remainder is housing. A printed circuit board (not shown) can be fixed to the housing by a connecting element through the holes 29. A circuit portion such as that shown in FIG. 7 may be formed on the printed circuit board in the usual manner. Any shape of the bar 10 and the hinge 27 may be used.

Figure 3:
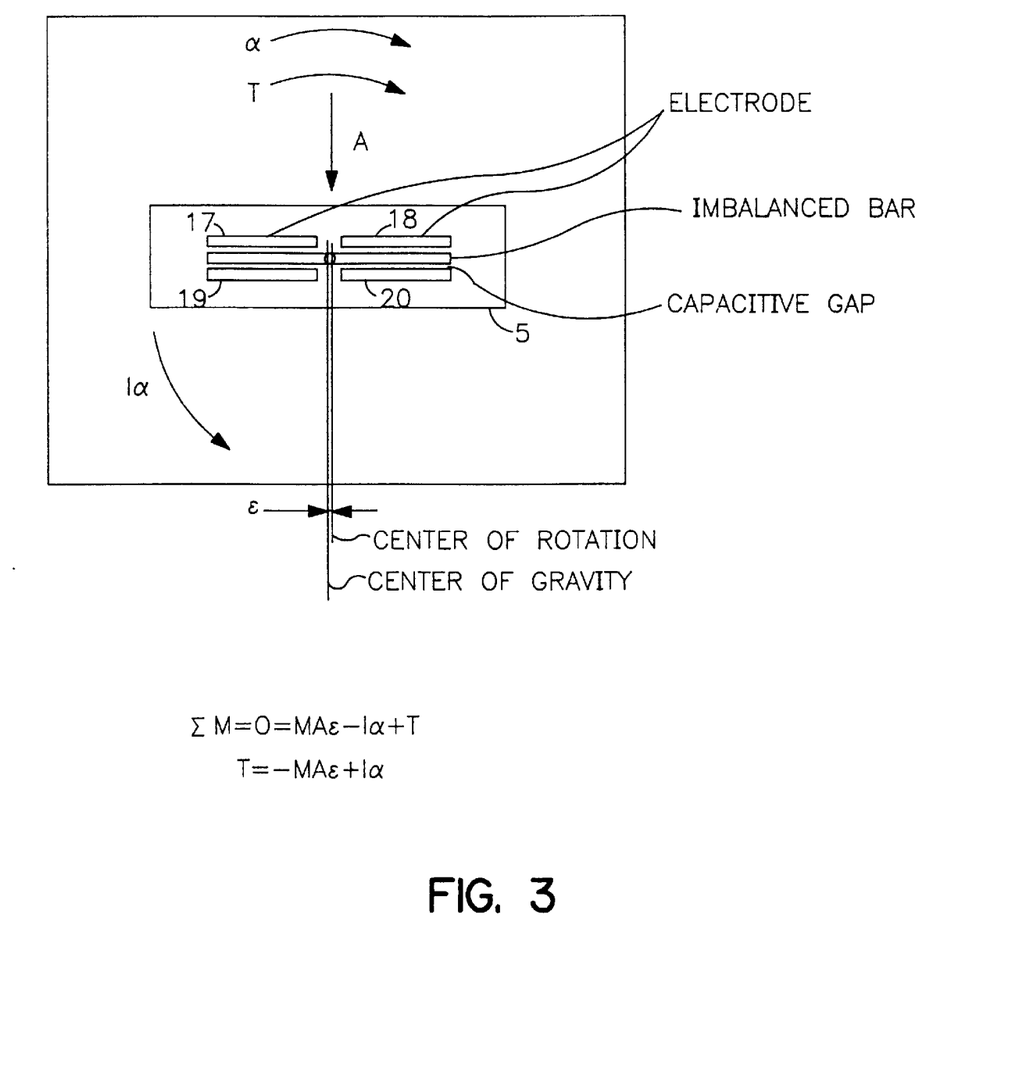
FIG. 3 is a diagram of a sensing module used to determine its linear and rotational response.

An imbalanced sensing module 5 is used to provide a measurable and combined response to one axis of linear acceleration and one axis of rotational acceleration. By itself, one module 5 provides only the combined output of linear and rotational acceleration. The combined reaction for both the linear response A and the rotational response $\alpha$ of the imbalanced flat bar 10 is shown in FIG. 3. When properly assembled with a substantially similar unit, the combination of two sensing modules that are substantially the same provides separate measurement of one linear axis of acceleration and one rotational axis of acceleration.

Figure 4A:
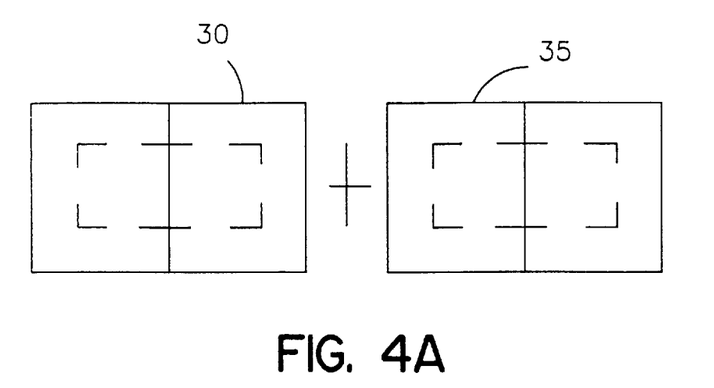
FIG. 4A is a top view of an exemplary two degree of freedom accelerometer in accordance with the present invention.
Figure 4B:
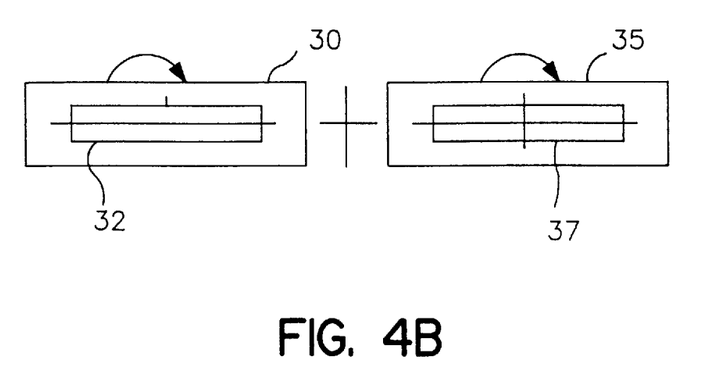
FIG. 4B is a side view of the two degree of freedom accelerometer of FIG. 4A.

FIGS. 4A and 4B show a top view and a side view, respectively, of two sensing modules 30, 35 that are used to determine one axis of rotational acceleration and one axis of linear acceleration (i.e., two degrees of freedom). The proof mass 32 in sensing module 30 is oriented such that the linear response due to the imbalanced mass adds to the rotational response of the sensor and the proof mass 37 in sensing module 35 is oriented such that its linear response subtracts from the rotational response of the sensor. Therefore, the sum of the two sensors provides a rotational output and the difference provides a linear output.

Figure 5:
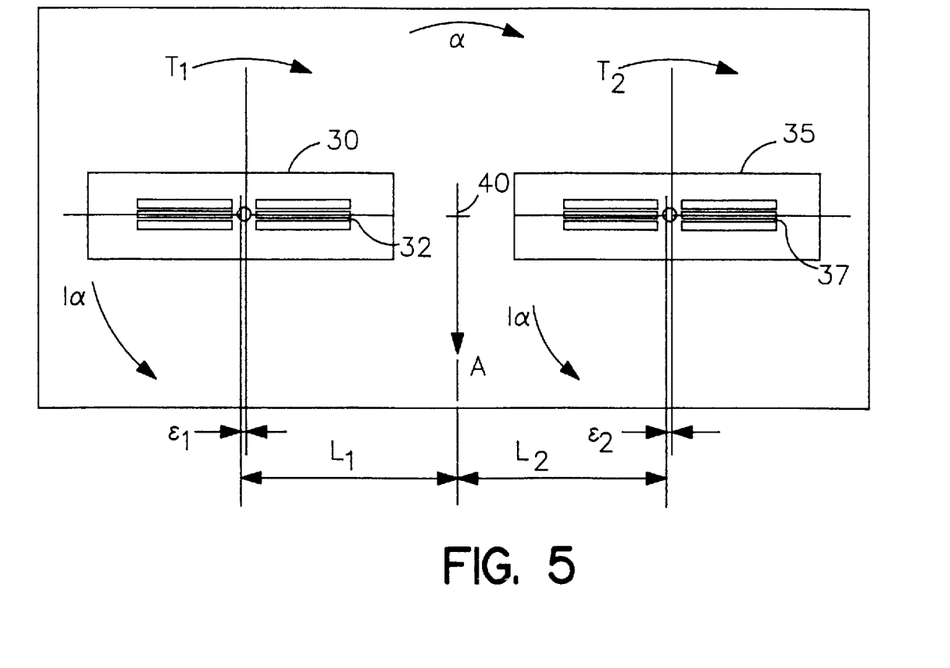
FIG. 5 is a diagram of two sensing modules used to illustrate the measurement of rotational and linear acceleration.

An exemplary arrangement for the use of two sensing modules 30, 35 with singular axis output from each unit and with the capability of providing both linear and rotational measurement in shown in FIG. 5. In the arrangement shown, two sensing modules 30, 35 are located at an equal but opposite distance from the point 40 at which acceleration A is to be measured. The center of mass of each module 30, 35 is located eccentric from the center of rotation by an amount $\epsilon$. The eccentricity in one sensing module is preferably in an opposite sense relative to a point between the two sensors. The center of mass and center of rotation of each module 30, 35 is located in line with the other module and in line with the point for which the measurement is to be obtained. The center of mass for each respective module is located at a fixed distance from the point of measurement. Preferably, the mounting reference is approximately midway between the two sensors. The singular output of each sensing module 30, 35 is the torque T that is provided by the electrostatic field in restraining the proof mass 32, 37 from being forced out of a null position by either the rotational acceleration α acting on the rotational inertia of the proof mass 32, 37 or the linear acceleration A acting through the center of mass at an eccentric moment arm with respect to the center.

The rotational acceleration α is determined from the addition of the reaction torque T of each sensing module 30, 35 and the linear acceleration A is determined from the difference in reaction torque T of the two sensing modules 30, 35. Equations (1)–(8) show the acceleration vectors and the resultant forces and torques with summation of moments M provided to illustrate the measurement of rotational acceleration α and linear acceleration A.

$$\Sigma M_1 = 0 = M_1 A \epsilon_1 - M_1 \lambda_1 \alpha \epsilon - I\alpha + T_1 \quad (1)$$

$$T_1 = -M_1 A \epsilon_1 + \alpha(M_1 \lambda_1 \epsilon_1 + I) \quad (2)$$

$$\Sigma M_2 = 0 = -M_2 A \epsilon_2 - M_2 \lambda_2 \alpha \epsilon - I\alpha + T_2 \quad (3)$$

$$T_2 = M_2 A \epsilon_2 + \alpha(M_2 \lambda_2 \epsilon_2 + I) \quad (4)$$

For $M_1 = M_2$, $\epsilon_1 = \epsilon_2$, $I_1 = I_2$ and $\lambda_1 = \lambda_2$:

$$T_1 + T_2 = 2\alpha(M\lambda\epsilon + I) \quad (5)$$

$$T_1 - T_2 = -2M\epsilon A \quad (6)$$

$$\alpha = (T_1 + T_2)/2(M\lambda\epsilon + I) \quad (7)$$

$$A = (T_2 - T_1)/2M\epsilon \quad (8)$$

Thus, the use of two sensing modules positioned within a single plane such that the influence of the linear acceleration is of an opposite sign for each unit provides the separation of the linear and rotational responses in accordance with the summation and difference of the individual module output.

The equations are useful to illustrate operation and design of a module for a desired acceleration. It may be difficult, however, to obtain any of these quantities for an actual device. It is therefore desirable to use conventional calibration techniques to obtain a useful device from any particular design.

Figure 6:
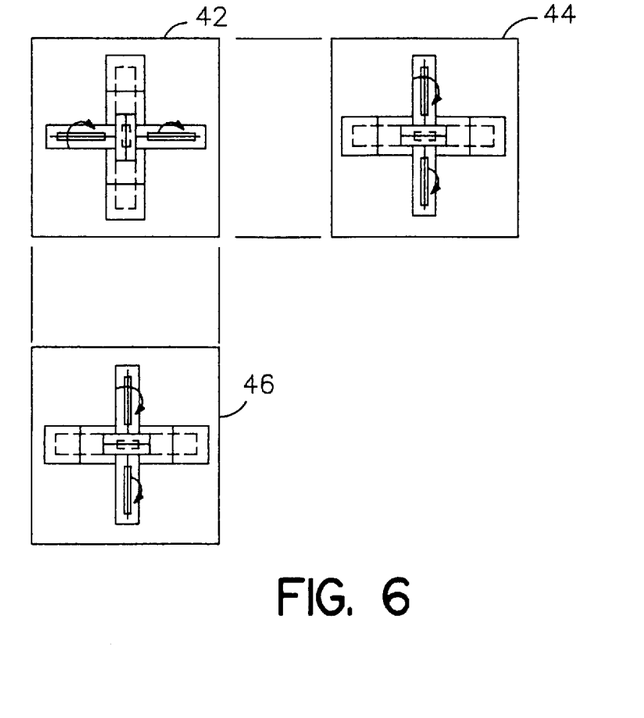
FIG. 6 is a side view of an exemplary six degree of freedom accelerometer in accordance with the present invention.

In addition to a 2 DOF accelerometer formed by two sensing modules as shown in FIGS. 4 and 5, six sensing modules can be assembled to form a 6 DOF accelerometer which measures all six degrees of freedom, as shown in FIG. 6. Pairs of sensing modules 42, 44 and 46, assembled in the same way as the pair shown in FIG. 5, are positioned in each of three mutually intersecting planes.

Based on a review of ejection-related data from simulations and sled tests, the inventors have determined exemplary optimal performance specifications for an exemplary 2 DOF accelerometer that has a sensor resolution requirement of 1.05% of full scale output. These performance specifications are shown in Table 2.

TABLE 2

|  | LINEAR | | ANGULAR | |
| --- | --- | --- | --- | --- |
|  | Units | Value | Units | Value |
| Range | g | ±75 | rad/sec² | ±1000 |
| Scale Factor (Sensitivity) | mV/g | 20 | mV/rad/sec² | 1.5 |
| Frequency Response | Hz | 200 | Hz | 200 |
| Bias | mV | ±5 | mV | ±1 |
| Resolution | g | ±0.5 | rad/sec² | ±12.5 |

TABLE 2-continued

|  | LINEAR | | ANGULAR | |
| --- | --- | --- | --- | --- |
|  | Units | Value | Units | Value |
| Threshold | g | ±0.5 | rad/sec² | ±12.5 |
| Cross-axis Sensitivity | % | 2 | % | 2 |
| Temperature Range | °C. | 0–70 | °C. | 0–70 |
| Power Supply | V | ±5 | V | ±5 |
|  | mA | 20 | mA | 20 |

The resolution of the individual sensing modules desirably provide, in combination, a linear resolution of 0.5 g and a rotational resolution of 12.5 radian/sec. With the dual imbalanced sensing modules, the eccentricity of the center of the mass, along with the amount and moment of inertia of the mass, is selected such that the arrangement is scaled for optimal resolution. For a given condition of mass and rotational inertia, optimum resolution is achieved through the proper sizing of the eccentricity.

Three methods of fabrication can be used for the multiple DOF accelerometer: micro-machining, conventional precision machining and deposition. Micro-machining includes both surface micro-machining and bulk micro-machining.

A major difficulty in the fabrication of very small rotational proof mass systems is the difficulty of fabricating a proof mass with adequate balance. In micro-machined parts, the balance of the machined part is highly dependent upon the uniformity of material deposition in the layer of mass to be used for micro-machining of the proof mass. This process has significant variation and does not provide adequate results for the micro-machining of the proof mass. Moreover, micro-machining has a relatively high cost.

Conventional precision machining techniques, such as electron discharge machining (EDM), or deposition as part of an integrated circuit may also be used. These fabrication methods avoid the many variables inherent in micro-machining and, thus, tend to reduce the fabrication cost. The device can be implemented on a single piece of silicon.

While the mechanical assembly of the exemplary 2 DOF accelerometer is small enough in size to meet the desired requirements, the exemplary embodiment assembled with discrete components can be miniaturized further by consolidating the discrete components into an application specific integrated circuit (ASIC).

Figure 7:
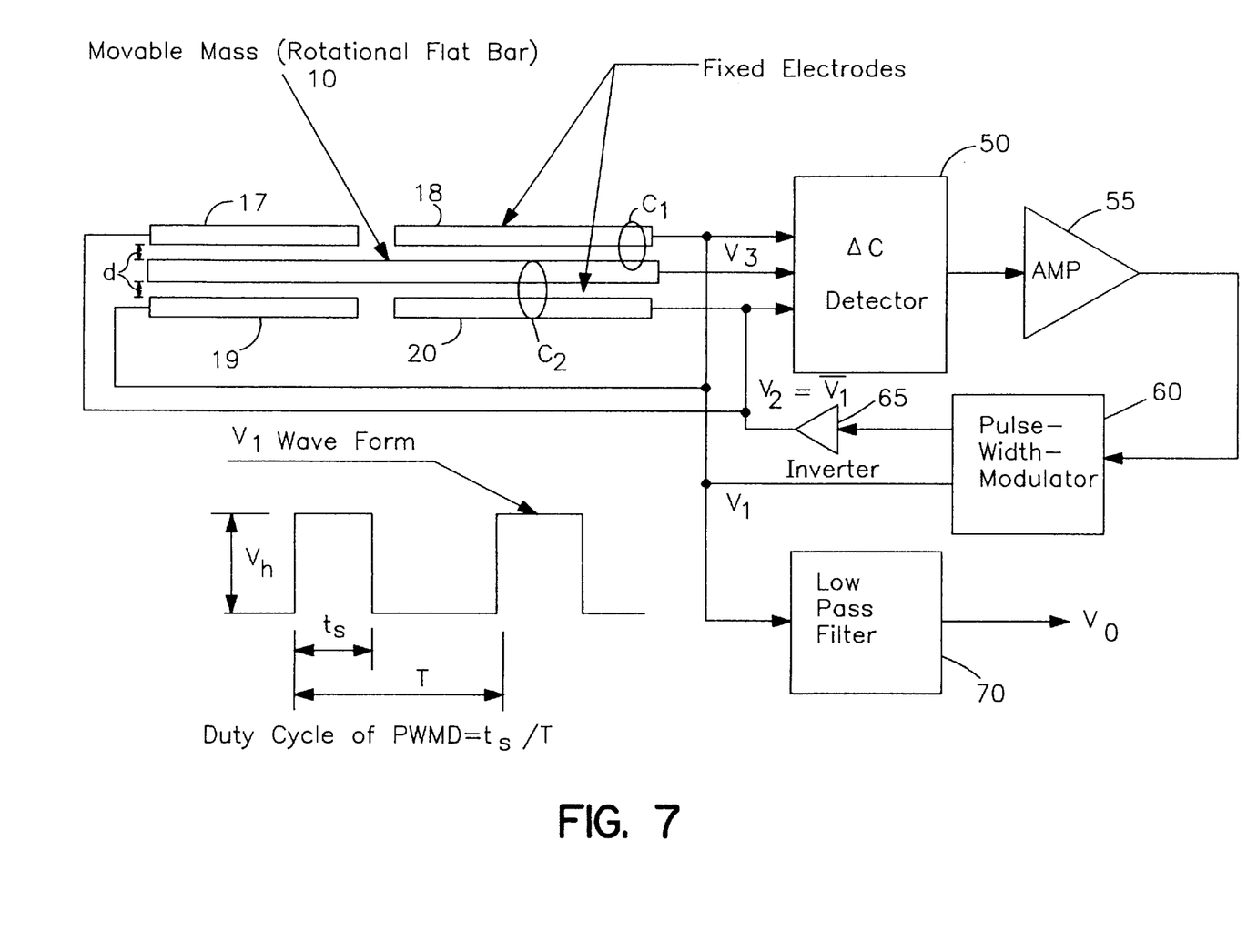
FIG. 7 is a schematic diagram of a capacitive-type accelerometer with PWM electrostatic servo technique.

In an accelerometer in accordance with the exemplary embodiment of the present invention, an electrostatic force field is used to maintain the position of the flat bar 10 within the sensing module 5 by providing the force necessary to accelerate the flat bar 10 in concert with the sensing module 5. A circuit diagram of an exemplary electrostatic servo control system of the present invention is shown in FIG. 7. The electrostatic servo force balance system in combination with a proof mass support 15 (not shown in FIG. 7), controls the position of the flat bar 10 within the sensing module. The forces required to maintain the flat bar 10 in its null position are provided by electrostatically charged plates or electrodes 17–20. The area of the charged plates 17–20 and the maximum available force are significant limiting factors in the design of an electrostatic force balanced accelerometer. The maximum force applied is equal to the mass of the proof mass times the maximum acceleration level (75 g's and 1000 rad/sec²) required for the sensor. The estimated sustained level of useful force is estimated by the inventors to be 3.9 N/m.

When the bar 10 is not tilted or offset by acceleration, capacitances between the bar 10 and the electrodes 17–20 are at their calibrated values, and there is no output voltage. When the sensing module 5 is accelerated along its axis of sensitivity, the flat bar 10 does not immediately accelerate with the unit and an initial error in position of the proof mass occurs within the accelerometer. The displacement error is along the axis of sensitivity of the sensing module 5. A position sensing technique, such as capacitive sensing, measures the position error and commands the servo to provide sufficient force to regain the null position for the flat bar 10. A measurement of the electrical energy required to maintain the position of the flat bar 10 within the accelerometer, against the acceleration of the unit, provides measurement of the acceleration.

The component architecture for the electrostatic servo force balance system may be a pulse width modulated (PWM) scheme in which the potential applied is fixed but the duty cycle, and thus the average electrostatic force, is varied.

The method implemented is similar to that described in Suzuki et al., "Semiconductor Capacitance-type Accelerometer with PWM Electrostatic Servo Technique", Sensors and Actuators, A21–A23 (1990), pp. 316–319, which is hereby incorporated by reference for its teachings on electrostatic servo techniques in which a semiconductor capacitance type accelerometer uses a PWM electrostatic servo technique as shown in FIG. 7.

Displacement of the support members of the proof mass of the accelerometer is measured by capacitive sensing of an insulated gap between the proof mass and the fixed body of the accelerometer. Acceleration of the proof mass causes the support structure to deflect and results in a capacitive change in proportion to the displacement of the mass. The capacitive sensing of displacement converts this displacement into an electrical charge that is proportional to the acceleration. This technique provides performance characteristics that are similar to conventional strain gage accelerometers in that measurement of proof mass deflection is proportional to strain in the support members and can therefore be used to deduce the acceleration of the proof mass.

The capacitance between the fixed electrodes 18 and 20 and the imbalanced flat bar 10 is determined by calculating the capacitance of the assembly and the sensitivity of the capacitance with respect to bar angle, electrode size, placement and area.

The capacitance sensor consists of the flat bar 10 with fixed electrodes 18 and 20 on each side of the bar 10. The bar 10, together with the two electrodes 18 and 20, constitute capacitors $C_1$ and $C_2$. A relationship between a bar deflection of $\Delta d$ and a total gap of d between the fixed electrodes 18 and 20 and the moveable bar 10 is shown in equation (9).

$$(\Delta d/d) = (C_1 - C_2)/(C_1 + C_2) \tag{9}$$

Transduction of an output voltage proportional to $(C_1 - C_2)/(C_1 + C_2)$ gives a linear relationship between the bar deflection and the output voltage. An application specific integrated circuit (ASIC) for high resolution measurement of this type of capacitance change is reported by Leuthold and Rudolf, "An ASIC for High-resolution Capacitive Microaccelerometers", Sensors and Actuators, A21–A23 (1990) which is hereby incorporated by reference for its teachings on capacitance measurement. The circuit is implemented in CMOS and is well suited for accelerometry applications.

Thus, the position of the flat bar 10 is detected by measuring the difference in capacitance between the mass and the fixed electrodes, $\Delta C$, by a switched capacitor technique using a capacitor detector 50 which may be, for example, a conventional bridge detector and provides a signal to an amplifier 55. The amplified signal is provided to a pulse width modulator 60. Two complementary PWM voltage waveforms are applied to the fixed electrodes 18 and 20 with the pulse width related to $\Delta C$ by means of a PID controller. The PWM waveform is filtered by a low pass filter 70 to provide the desired acceleration transient $V_o$.

In order to ensure low harmonic distortion, even at high accelerations, the mass displacement is desirably kept small. This is achieved by applying a feedback loop, where the electrostatic feedback force is generated by applying two PWM voltage signals, $V_1$ and $V_2$, from the pulse width modulator 60 across two fixed parallel electrodes 18 and 20, with area A and separation distance d, on either side of the movable flat bar 10. $V_2$ is equal in amplitude to the signal $V_1$, but it is inverted by inverter 65. The amplitude of the signals is $V_h$.

By changing the pulse widths of the PWM signals, the effective amounts of electrostatic forces to the movable mass are controlled to enable the movable mass to be kept exactly at the null position. With this PWM electrostatic servo technique, the pulse widths become proportional to the applied acceleration.

The electrostatic feedback force $F_{fb}$ is generated by applying the voltage $V_h$ across the two electrodes 18 and 20 having area A and electrostatic gap distance d. Using the parallel plate approximation and disregarding the fringe fields this force is given by equation (10).

$$F_{fb} = \frac{\epsilon A V_h^2}{2d^2} \tag{10}$$

This principle is used by Allen et al., "Accelerometer Systems with Built-In Testing", Sensors and Actuators, A21–A23 (1990), which is hereby incorporated by reference for its teachings on determining electrostatic feedback force for testing the accelerometer during operation. Using this set-up, the same fixed electrodes 18 and 20 used for electrostatic feedback can be used to determine mass position, yielding a capacitive sensor.

A closed-loop feedback control system is an integral part of the electrostatic servo force balance system. The multiple DOF accelerometer has a closed loop (force balance) design. The analysis and design of the control system for force balance demonstrates that the multiple DOF accelerometer maintains a closed loop bandwidth of 1 kHz and a steady state error of zero for full scale accelerations up to 75 g's and 1000 rad/sec². This high level of performance may be obtained by utilizing PWM of the voltage for the balancing or restoring forces, and a special PID controller for the feedback system. The duty cycle of the PWM waveform is a measure of the acceleration.

The design of the feedback controller is intrinsically related to the identification of the closed loop model of the servo-accelerometer system. Variations in the mechanical fabrication of the bar assembly coupled with uncertainties in electronic compensation circuitry complicate the analysis and design of the closed loop system. Therefore, a state-space model of the feedback system, derived from real-time test data, is determined to yield the moment of inertia, damping and mechanical stiffness of the eccentric bar assembly.

Figure 8:
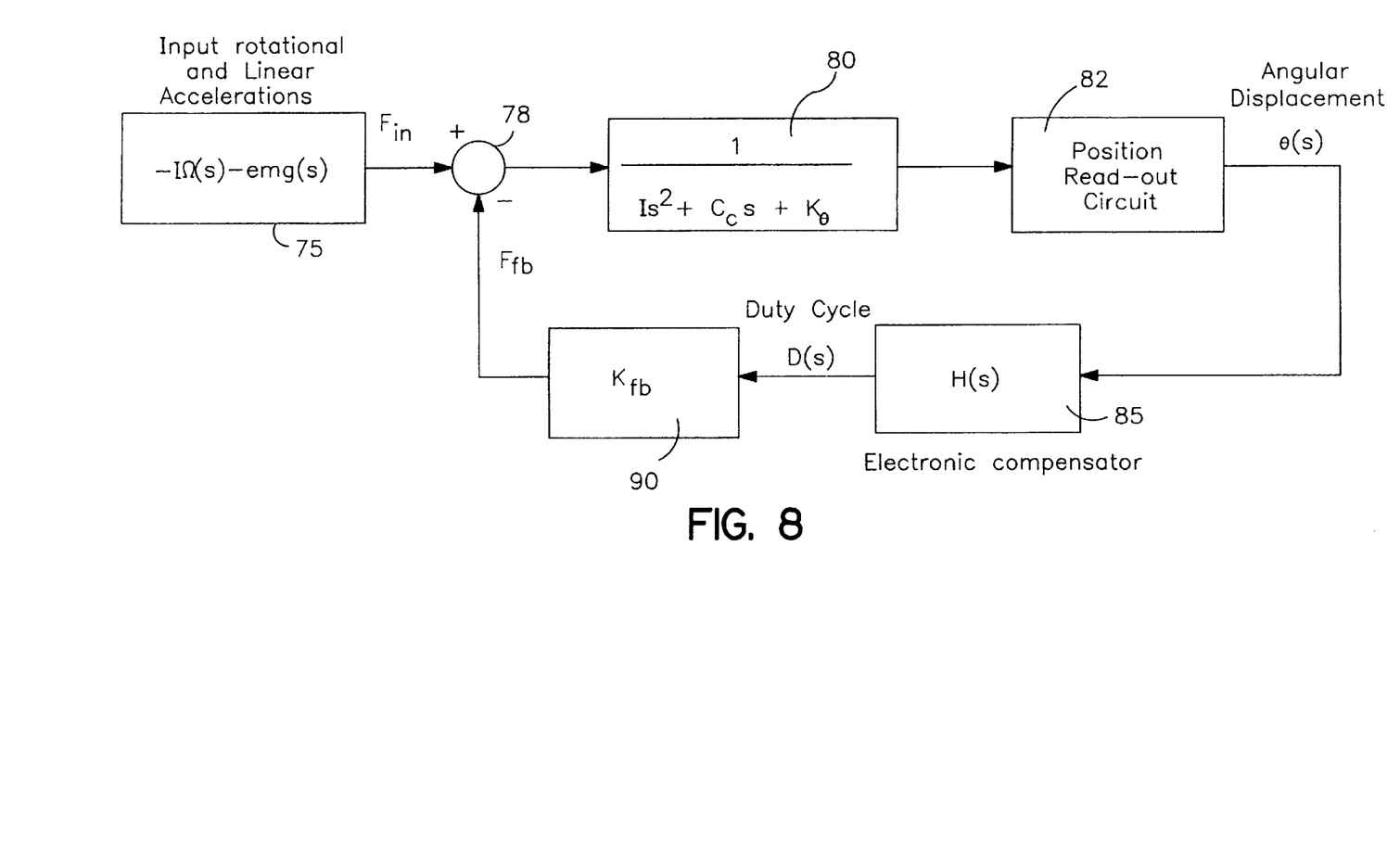
FIG. 8 is a block diagram of a servo-accelerometer using position feedback.

The exemplary servo system is composed of mechanical, electrical, and electrostatic force parts. A block diagram of the electrostatic servo system is shown in FIG. 8, in which θ is the angular position from the read-out circuit, H(s) is the transfer function of the electronic compensator, the output signal of which is the duty cycle $D(s) = t_s(s)/T$, and $K_{fb}$ is the electrostatic feedback gain (see equation (10)).

The dynamic behavior of the accelerometer is determined by the moment of inertia, I, the damping coefficient, $C_c$, and the torsional spring constant, $K_\theta$, of the suspension system, as given by equation (11).

$$\frac{\theta(s)}{F_{in}(s)} = \frac{1}{Is^2 + C_c s + K_\theta} \qquad (11)$$

where the input force acting on the system is given by equation (12).

$$F_{in}(s) = -I\Omega(s) - emg(s) \qquad (12)$$

$\Omega$ is angular acceleration, m is mass, g is acceleration, and e is the eccentricity of the accelerometer. The rotational displacement of the mass, $\theta(s)$, and the input force, $F_{in}(s)$, are both in the Laplace "s" domain. This formulation is only valid for small mass excursions because in that case both the damping and the beam suspension can be approximated by linear equations.

The input force is provided into the system at input 75 and the feedback force $F_{fb}$ is subtracted from it at adder 78. The dynamic behavior of the accelerometer is determined by arithmetic unit 80 which provides the dynamic behavior to a position read-out circuit 82. The position read-out circuit 82 provides the angular displacement $\theta(s)$ to an electronic compensator 85 which provides the duty cycle PWM signal D(s) to a pulse generator 90. The pulse generator 90 provides the feedback force $F_{fb}$ to the adder 78.

The key element is the electrical feedback component H(s). The proper PWM signal D(s) preferably maintains the flat bar 10 in the null position while the entire accelerometer assembly is undergoing external disturbances in the form of both rotational and linear accelerations. In a control system context, this is a classical disturbance rejection problem in that one desires to maintain a desired state of the system (i.e., seismic mass displacement at the null position q=0) when the system to be controlled is subject to external disturbances.

The electrostatic servo force balance system may be constructed from standard analog and digital ICs as described in the above references article by Suzuki et al.

Auxiliary equipment (not shown) includes additional support equipment such as a power source, control circuitry, calibration system, readout panel and other equipment that may be needed in connection with the sensing assembly. It is preferable to minimize the amount of the auxiliary equipment that is required for operation of the sensing assembly.

A self testing system (STS) (not shown) is provided in the accelerometer to verify the static and dynamic performance of the accelerometer. The STS inputs a signal that functions as an apparent known acceleration for an observable output. The STS also "opens" the closed-loop state-space feedback system of the accelerometer and inputs a signal to verify its performance. In other words, a known excitation or voltage is applied for a period of time, and then the electrostatic force of the device is monitored to determine if a known expected signal or deflection is received. For example, during self-testing of the system in FIG. 7, a switch (not shown) is used to control testing of the electrodes 17–20. The switch is initially set to self-test electrodes 17 and 18 by applying a known voltage for a period of time to, for example, the electrodes 19 and 20 while applying no potential or an opposite potential on the electrodes 17 and 18, and then measuring the electrostatic force. This simulates a linear acceleration force being applied to the accelerometer. The switch is then set to self-test electrodes 19 and 20 using the same method.

The magnitude and duration of a step input signal, the magnitude and slope of a ramp input signal and the magnitude and frequency of a sinusoidal input signal are varied to determine the performance of the accelerometer under self test. The STS is constructed using analog ICs and CMOS analog switches. The STS is constructed as part of the electronic servo force balance system.

An exemplary method of calibrating a 2 DOF accelerometer is to apply a known linear and rotational acceleration to both sensing modules at the same time and measure the response. An exemplary calibration system using this technique is shown in U.S. Pat. No. 5,473,945, entitled MICRO-MECHANICAL ANGULAR ACCELEROMETER WITH AUXILIARY LINEAR ACCELEROMETER and issued to Grieff et al., which is hereby incorporated by reference for its teachings on accelerometer calibration.

Put another way, recognizing that within elastic limits, structural behavior is linear, an accelerometer may be viewed as a linear black box, with accelerations as the inputs and the transduced signals as the output. Thus a 2 DOF accelerator may be regarded as a frequency sensitive input-output device, which yields two output signals for an input of two acceleration components. In the terminology of vector algebra, the entire input acceleration component vector space is mapped into the output signal vector space. This mapping is defined by a frequency dependent transformation matrix which can always be determined if for a set of two linearly independent acceleration vectors, the corresponding two output signals are also linearly independent. If the bandwidth of interest is well below the lowest natural frequency of the black box, one can assume that the frequency dependency is small, and the error resulting from it can be minimized by a least squares averaging over the vector space of interest.

The foregoing idea can be stated analytically as follows. The applied vector of accelerations $\bar{a}$, and the resulting output signals $\bar{v}$, are related by the matrix equation (13).

$$\bar{v} = T\bar{a} + \bar{b} \qquad (13)$$

where T is the transfer matrix and $\bar{b}$ is the vector of biases or offsets resulting from various causes. The bias vector may be nulled electrically, or its value may be stored and subtracted in subsequent evaluation so that equation 14 is obtained.

$$\bar{v} = T\bar{a} \qquad (14)$$

The matrix T may be found as follows. A set of two calibration acceleration vectors $\bar{x}$ (selected to be linearly independent) are applied and the corresponding outputs are measured. The bias vector $\bar{b}$ is subtracted and the resulting vectors are recorded as columns of a matrix B. By virtue of equation (14), equation (15) holds:

$$B = T[\bar{x}] \qquad (15)$$

where the columns of matrix $[\bar{x}]$ are the two calibration acceleration vectors arranged in the same sequence as the corresponding columns of signal voltages in B.

Since $[\bar{x}]$ is a square matrix whose columns are linearly independent by design, its inverse exists. Consequently, from equation (15), equation (16) is obtained.

$$T = B[\bar{x}]^{-1} \qquad (16)$$

The accelerations to be measured are determined from equation (17).

$$\bar{a} = T^{-1}(\bar{v} - \bar{b}) \qquad (17)$$

The foregoing theory can be readily extended to include least squares minimization of the error vector in both the frequency space and the acceleration component space.

Accelerometer output circuitry (AOC) (not shown) provides a signal that can be read and recorded by other instrumentation. The AOC is constructed with standard analog and digital ICs. The AOC has a continuous time voltage signal which is the analog of the acceleration observed and, optionally, a discrete time serial data communication digital signal that can be recorded directly.

The PWM signal is converted to a digital signal directly by a counter. The analog output is then provided by a digital-to-analog converter. Alternatively, if no digital output is required, the PWM signal is directly integrated and low-pass filtered to provide an analog output signal, as described by Suzuki et al.

The AOC has a synchronous digital signal flow control interface so that multiple accelerometers can be integrated as a peripheral system of a microcontroller. The AOC is constructed as part of the electronic servo force balance system.

Although illustrated and described herein with reference to certain specific embodiments, the present invention is nevertheless not intended to be limited to the details shown. Rather, various modifications may be made in the details within the scope and range of equivalents of the claims and without departing from the invention.

What is claimed:

1. An accelerometer comprising:
   a plurality of sensing modules for determining linear and angular accelerations in a plurality of degrees of freedom, each sensing module comprising:
   a housing;
   a proof mass having a dimension, a shape, a mass, and a center of gravity, said proof mass mounted displaced from said center of gravity by an amount which produces a displacement response to both linear and angular acceleration;
   a support for connecting said proof mass to said housing; and
   detection means for detecting said displacement response of said proof mass.

2. An accelerometer according to claim 1, wherein said proof mass is a substantially rectangular bar.

3. An accelerometer according to claim 1, wherein said dimension is a length and said amount which produces said mass imbalance is small relative to said length of said proof mass.

4. An accelerometer according to claim 1, further comprising processing circuitry including electrostatic force balancing means for balancing inertial forces and measuring means for measuring a force required to balance said proof mass.

5. An accelerometer according to claim 4, wherein the electrostatic force balancing is pulse width modulated.

6. An accelerometer according to claim 1, wherein the dimension, the shape and the mass of said proof mass in each sensing module are substantially the same.

7. An accelerometer according to claim 1, wherein said detection means includes a plurality of capacitors, each capacitor having substantially the same construction and comprising a fixed electrode located opposite to a surface of said proof mass.

8. An accelerometer according to claim 1, wherein said support comprises two in line hinges on opposite sides of said proof mass.

9. An accelerometer according to claim 1, wherein said support comprises a torsional bar.

10. An accelerometer according to claim 1, wherein said support comprises bearing supports.

11. An accelerometer according to claim 1, wherein said plurality of sensing modules are coupled into pairs, each pair of sensing modules detecting movement in two degrees of freedom in a plane.

12. An accelerometer according to claim 11, wherein said plurality of sensing modules consists of two sensing modules for detecting movement in two degrees of freedom in a plane.

13. An accelerometer according to claim 11, wherein said plurality of sensing modules consists of four sensing modules for detecting movement in four degrees of freedom.

14. An accelerometer according to claim 11, wherein said plurality of sensing modules consists of six sensing modules for detecting movement in six degrees of freedom.

15. An accelerometer comprising:
   a pair of sensing modules for determining linear and angular accelerations in two degrees of freedom, each sensing module comprising:
   a housing;
   a proof mass having a dimension, a shape, a mass, and a center of gravity, said proof mass mounted displaced from said center of gravity by an amount which produces a displacement response to both linear and angular acceleration;
   a support for connecting said proof mass to said housing;
   detection means for detecting said displacement response of said proof mass; and
   processing circuitry for receiving a first signal indicative of angular and linear acceleration imposed on said proof mass and responsive to a second signal generated by a second sensing module which is substantially the same as the first sensing module to generate a measure of linear acceleration and a measure of angular acceleration;
   wherein the pair of sensing modules is located in a plane for measuring motion in the two degrees of freedom.

16. An accelerometer according to claim 15, wherein said sensing modules are substantially the same.

17. An accelerometer comprising:
   three pairs of sensing modules for determining linear and angular accelerations in six degrees of freedom, each sensing module comprising:
   a housing;
   a proof mass having a dimension, a shape, a mass, and a center of gravity, said proof mass mounted displaced from said center of gravity by an amount which produces a displacement response to both linear and angular acceleration;
   a support for connecting said proof mass to said housing;
   detection means for detecting said displacement response of said proof mass; and
   processing circuitry for receiving a first signal indicative of angular and linear acceleration imposed on said proof mass and responsive to a second signal generated by a second sensing module which is substantially the same as the first sensing module to generate a measure of linear acceleration and a measure of angular acceleration;
   wherein each of the three pairs of sensing modules is located in a different mutually intersecting plane for measuring the six degrees of freedom.

18. An accelerometer comprising a plurality of substantially similar sensing modules for determining linear and angular accelerations in a plurality of degrees of freedom, each sensing module comprising:

a housing;

a proof mass having a dimension, a shape, a mass, and a center of gravity, said proof mass mounted displaced from said center of gravity by an amount which produces a displacement response to both linear and angular acceleration;

a support having two opposed hinges on opposite sides of said proof mass for connecting said proof mass to said housing;

detection means having a plurality of substantially similar capacitors comprising a fixed electrode located opposite to a surface of said proof mass for detecting said displacement response of said proof mass; and processing circuitry for receiving a first signal indicative of angular and linear acceleration imposed on said proof mass and responsive to a second signal generated by a second sensing module which is substantially the same as the first sensing module to generate a measure of linear acceleration and a measure of angular acceleration.

19. An accelerometer comprising:

three pairs of substantially similar sensing modules in three different planes for determining linear and angular accelerations in six degrees of freedom, each sensing module comprising:

a housing;

a proof mass having a dimension, a shape, a mass, and a center of gravity, said proof mass mounted displaced from said center of gravity by an amount which produces a displacement response to both linear and angular acceleration;

a support having two opposed hinges on opposite sides of said proof mass for connecting said proof mass to said housing;

detection means having a plurality of substantially similar capacitors comprising a fixed electrode located opposite to a surface of said proof mass for detecting said displacement response of said proof mass; and processing circuitry for receiving a first signal indicative of angular and linear acceleration imposed on said proof mass and responsive to a second signal generated by a second sensing module which is substantially the same as the first sensing module to generate a measure of linear acceleration and a measure of angular acceleration.

* * * * *